(12) United States Patent
Poggioli et al.

(10) Patent No.: US 7,464,943 B1
(45) Date of Patent: Dec. 16, 2008

(54) BEACH CADDY

(76) Inventors: Nancy Poggioli, 16 Fieldstone Dr., Syosset, NY (US) 11791; Robert Poggioli, 16 Fieldstone Dr., Syosset, NY (US) 11791

( * ) Notice: Subject to any disclaimer, the term of this patent is extended or adjusted under 35 U.S.C. 154(b) by 0 days.

(21) Appl. No.: 11/882,676

(22) Filed: Aug. 3, 2007

(51) Int. Cl.
*B62B 13/18* (2006.01)
(52) U.S. Cl. .................. 280/9; 280/8; 280/10
(58) Field of Classification Search .............. 280/8, 280/9, 10, 11
See application file for complete search history.

(56) References Cited

U.S. PATENT DOCUMENTS

| | | | | |
|---|---|---|---|---|
| 1,435,609 A * | 11/1922 | Kelly | ................ | 280/11 |
| 2,929,021 A | 2/1960 | Altadonna | | |
| 3,677,571 A * | 7/1972 | Maturo et al. | ................ | 280/654 |
| 4,139,208 A | 2/1979 | Kaley et al. | | |
| 4,159,119 A * | 6/1979 | Smith | ................ | 280/9 |
| 4,291,891 A | 9/1981 | Blanchette | | |
| 4,863,075 A | 9/1989 | Romer | | |
| 4,865,346 A * | 9/1989 | Carlile | ................ | 280/654 |
| 5,273,298 A * | 12/1993 | Brown, Sr. | ................ | 280/47.19 |
| 6,042,122 A * | 3/2000 | Mohr | ................ | 280/9 |
| 6,131,925 A * | 10/2000 | Weldon | ................ | 280/30 |
| 6,533,298 B2 * | 3/2003 | Sims | ................ | 280/47.26 |
| 6,543,800 B1 | 4/2003 | Doran | | |
| 6,712,250 B2 * | 3/2004 | Vigny | ................ | 224/640 |
| 2006/0279052 A1 * | 12/2006 | Marmah et al. | ................ | 280/47.26 |

* cited by examiner

*Primary Examiner*—Christopher P Ellis
*Assistant Examiner*—John D. Walters
(74) *Attorney, Agent, or Firm*—Richard C. Litman

(57) ABSTRACT

The beach caddy is a bin for carrying items to a selected beach location that is provided with runners for sliding over loose soils and sand, and with retractable wheels for rolling over hard or paved surfaces. A drawstring netting is provided over the bin for keeping items in the bin from falling out when the caddy is in tow. Hooks are provided at the top of the bin for carrying beach chairs on the side of the bin. A bungee cord is tied around the bin for securely holding the chairs in the hooks to the side of the bin.

5 Claims, 7 Drawing Sheets

BEACH CADDY

BACKGROUND OF THE INVENTION

1. Field of the Invention

The present invention relates generally to vehicles, and more specifically to a beach caddy having retractable wheels for use on pavement, but slides on loose sandy surfaces.

2. Description of the Related Art

People on a beach outing usually have to carry many items from their cars to a selected location on the beach. To reduce the number of trips back and forth from their cars to the beach, many try using carriers, such as wagons or carts. Wagons are suitable for use on hard or paved surfaces, but not for use in sand or other loose soils. The wagons and other wheeled carts frequently become bogged down and difficult to move, or turn over, spilling beach gear, food and beverages onto the ground.

Thus, a beach caddy solving the aforementioned problems is desired.

SUMMARY OF THE INVENTION

The beach caddy has a bin for carrying items to a selected beach location. The caddy is provided with runners for sliding over loose soils and sand, and retractable wheels for rolling over hard or paved surfaces. Drawstring netting is provided over the bin for keeping items in the bin from falling out when the caddy is in tow.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
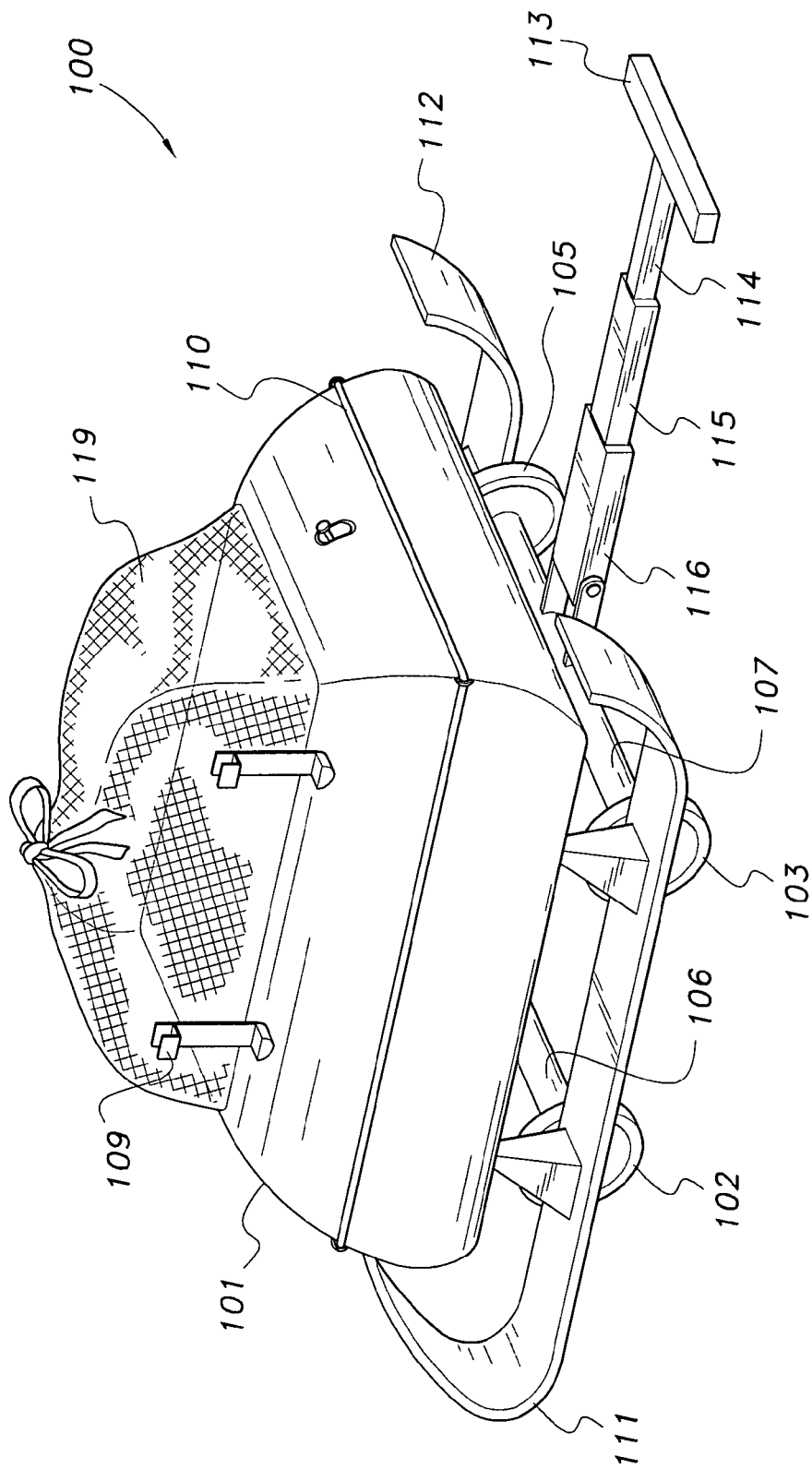
FIG. 1 is a perspective view of a beach caddy according to the present invention with the wheels extended for use on pavement.

The present invention is a beach caddy for alternately carrying items on hard paved surfaces and loose sandy surfaces. FIG. 1 shows the beach caddy 100 set for rolling on a street or sidewalk. Caddy 100 comprises a bin 101 supported on two runners. Four wheels 102, 103, 104 and 105 are provided for movement of the caddy 100 on hard or paved surfaces. Wheels 102 and 104 are mounted on a fixed axle 106. Wheels 103 and 105 are mounted on pivoting axle 107, so that the front wheels can pivot around a vertical axis in the direction of a turn. Both axles 106 and are mounted to a center bar 108 (shown in FIG. 4) that is connected to both axles 106 and 107, and to a mechanism for retracting the wheels.

Figure 2:
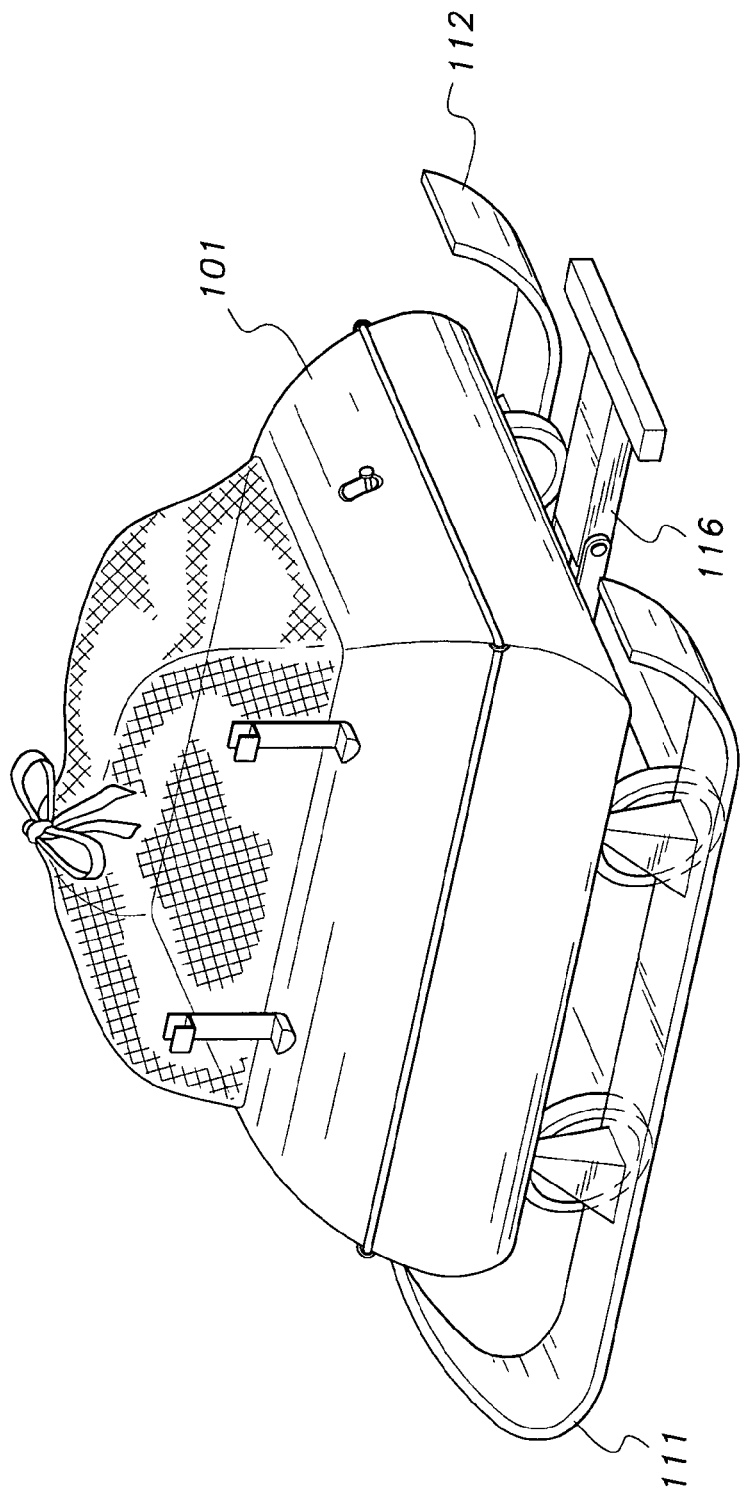
FIG. 2 is a perspective view of the beach caddy according to the present invention with the wheels retracted for use on sand.
Figure 3:
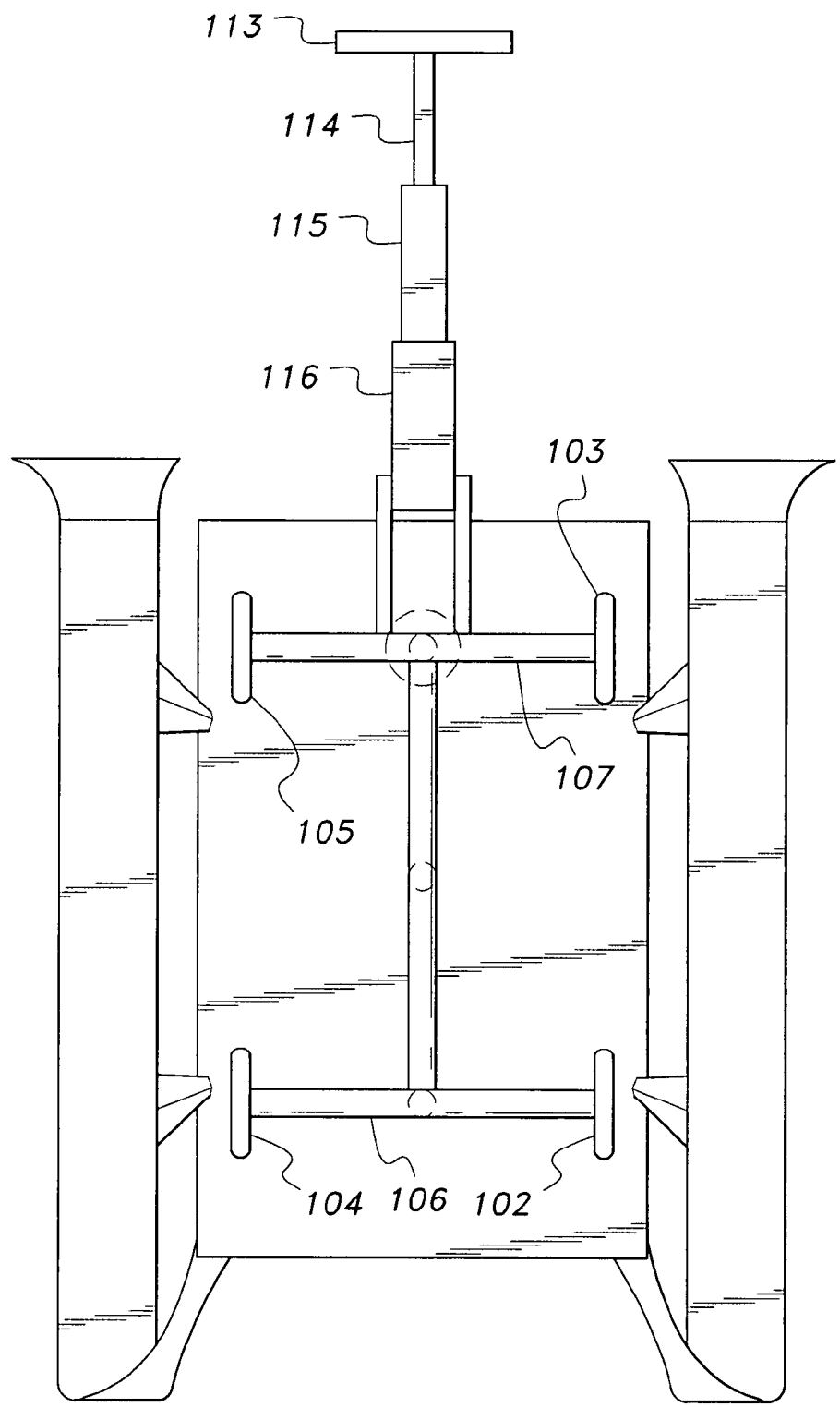
FIG. 3 is a bottom view of the beach caddy according to the present invention.
Figure 4:
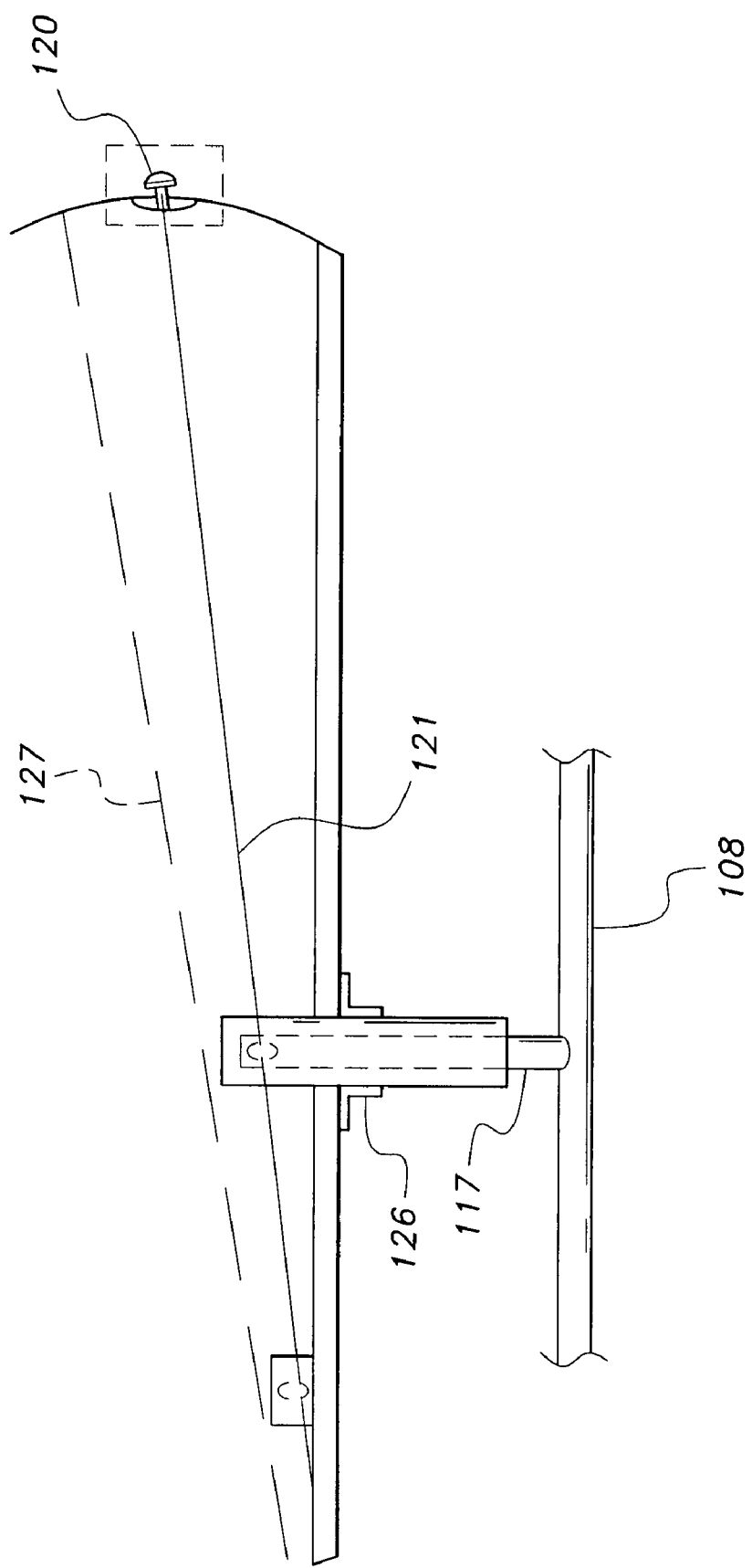
FIG. 4 is a partial schematic view showing the wheel retracting mechanism of a beach caddy according to the present invention.
Figure 5:
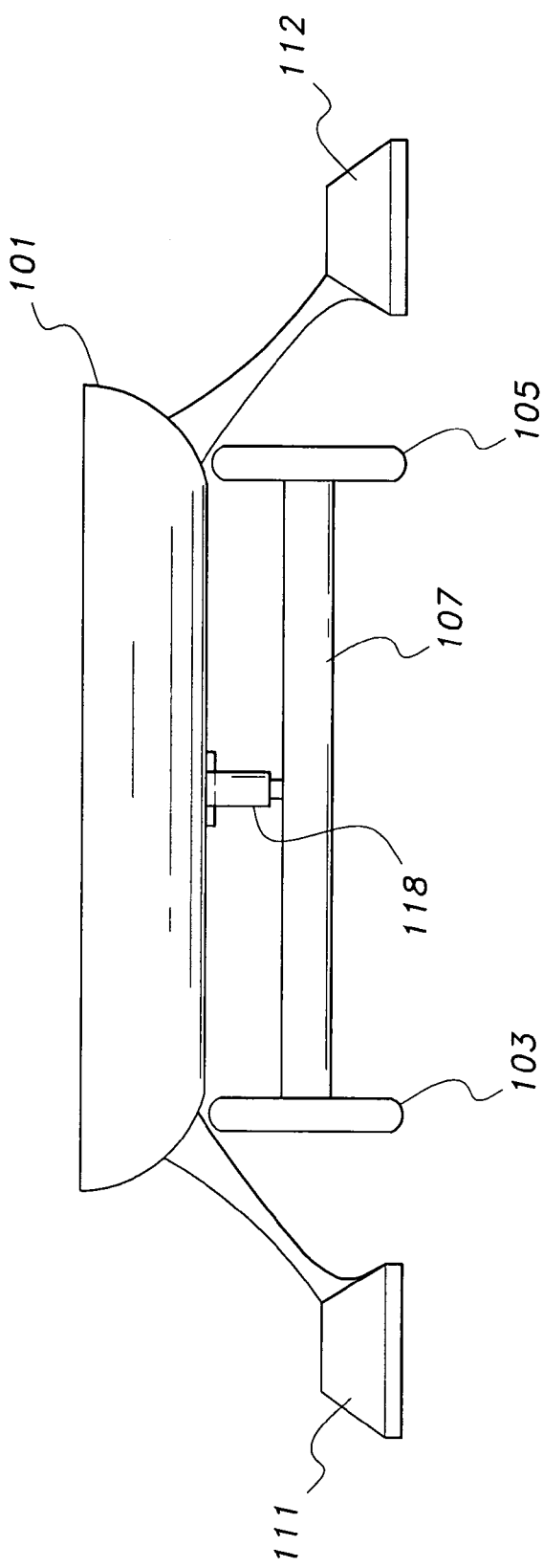
FIG. 5 is a front view of the beach caddy according to the present invention with the wheels retracted.
Figure 6:
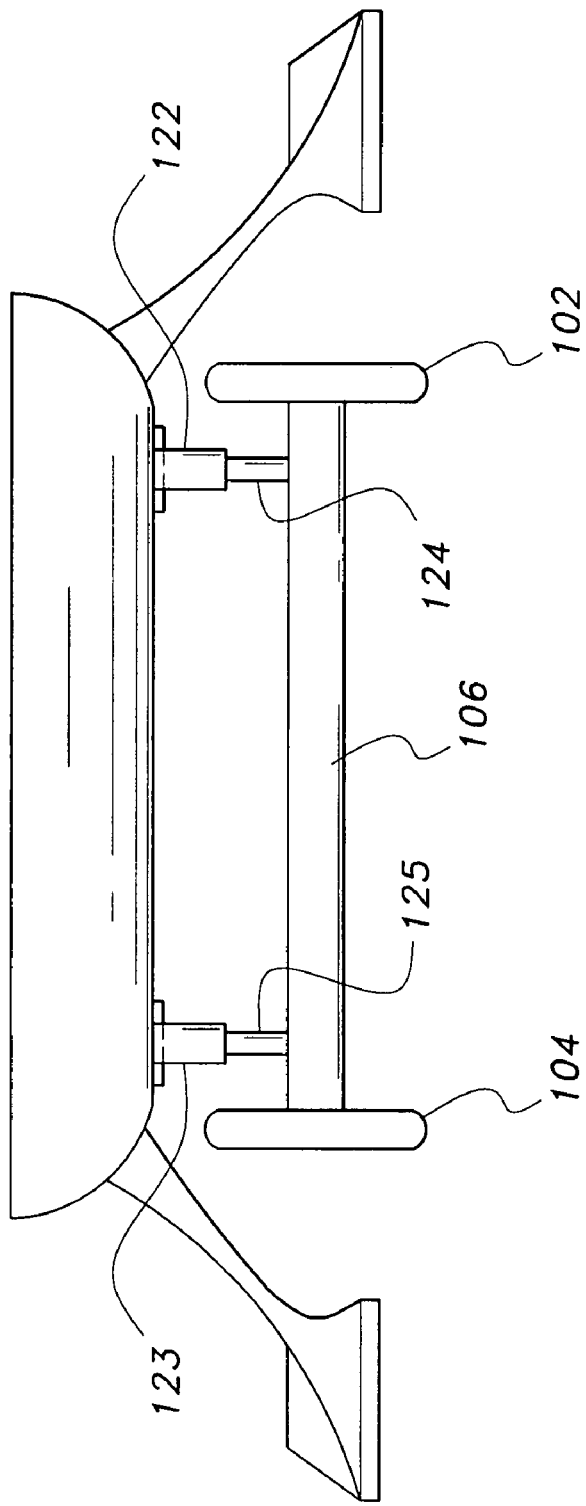
FIG. 6 is a rear view of the beach caddy according to the present invention with the wheels retracted.

FIG. 2 shows the caddy 100 with the wheels retracted so that runners 111 and 112 engage the ground for traveling on loose sandy soil. A retractable handle 113 (shown extended in FIG. 1 and retracted in FIG. 2) for towing the caddy 100 is connected to pivoting axle 107, and can be used both to pull and to steer the caddy 100. The handle 113 has telescopic segments 114, 115 and 116, which are shown in the extended position in FIG. 1 and in the retracted position in FIG. 2. FIG. 5 shows the pivoting axle 107 mounted in the fixed guide 118, which has telescoping sections to permit retraction of the front wheels 103 and 105. Referring to FIG. 4, a fixed bracket 126 is connected to retraction bar 117 and the base of bin 101. As shown in FIG. 6, a pair of fixed guides 122, 123 are formed above the fixed axle 106 for engaging guide rods 124 and 125 that are affixed to axle 106, the rods 124 and 125 telescoping into guides 122 and 123 to permit retraction of the rear wheels 102 and 104.

Figure 7:
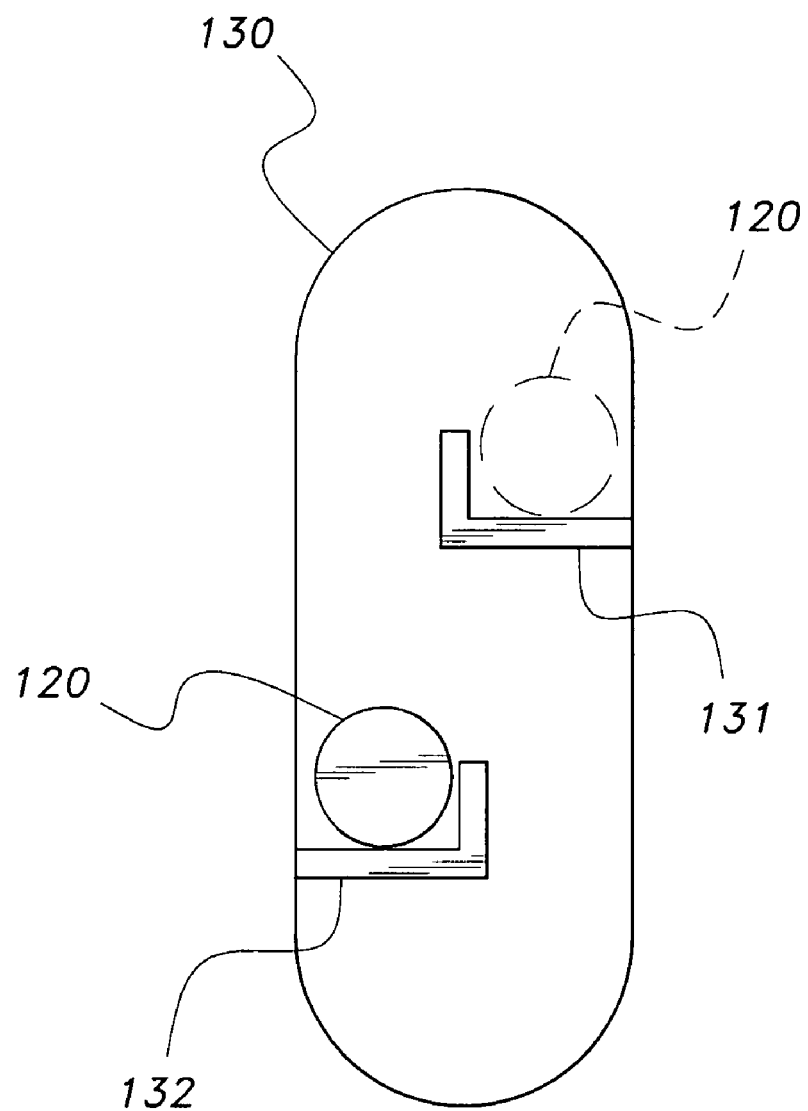
FIG. 7 is a front view of the slotted opening in the bin of a beach caddy according to the present invention.

The mechanism for retracting the wheels 102-105 is shown in FIGS. 4 and 7. Lever 120 extends through an opening in the front of the bin 101 and is covered by a conical molded cover, the top portion of which is represented by dash lines 27 in FIG. 4. The slotted opening 130 in the front of the bin 101 is provided with a pair of hooks. A top hook 131 supports lever 120 in a wheels retracted position and the bottom hook 132 supports lever 120 in a wheels down position. Lever 120 is connected to a lifting lever 121 that is connected to a retraction bar 117. Retraction bar 117 is connected to center bar 108 so that when the lever 120 is moved up and down, the center bar 108 is raised and lowered, respectively. When the center bar 108 is raised, axles 106 and 107 are raised so that the wheels 102-105 are retracted and runners 111 and 112 engage the ground. When the center bar 108 is lowered, axles 106 and 107 are lowered and the wheels 102-105 extend outwardly beyond the runners 111, 112 so that the wheels 102-105 engage the ground.

Retractable chair hooks 109 are mounted on the top of the bin 101. A chair is placed upon a hook 109 and held securely against the bin 101 by a bungee cord 110 tied around the center of the bin 101. Drawstring netting 119 covers the open top of bin 101 to prevent the loss of items placed in the bin 101 when the bin 101 is in tow.

It is to be understood that the present invention is not limited to the embodiment described above, but encompasses any and all embodiments within the scope of the following claims.

We claim:

1. A beach caddy, comprising:
   a bin having a pair of runners attached thereto, said bin defining a front slotted opening;
   a fixed rear axle having a pair of wheels mounted on opposite ends thereof;
   a pivoting front axle having a pair of wheels mounted on opposite ends thereof;
   a central bar extending between the pivoting front axle and the fixed rear axle;
   a retractable handle connected to the pivoting front axle; and
   means connected to said central bar for extending and retracting the wheels, the wheels having an extended position in which the wheels engage the ground and a retracted position in which the wheels are raised so that the runners engage the ground, said means for extending and retracting said wheels comprising:
   a retraction bar connected to said center bar; and a lifting lever connected to the retraction bar, the lever extending through the slotted opening.

2. The beach caddy according to claim 1, further comprising:
- a pair of chair hooks attached to an upper portion of said bin; and
- a bungee cord surrounding a central portion of said bin.

3. The beach caddy according to claim 1, further comprising drawstring netting covering an open top of the bin.

4. The beach caddy according to claim 1, wherein said retractable handle has telescopic segments.

5. The beach caddy according to claim 1, wherein said means for extending and retracting said wheels further comprises a top hook and a bottom hook disposed at the slotted opening in said bin, whereby
- upon moving the lifting lever upward to engage the top hook, the center bar is raised to move the wheels to the retracted position; and
- upon moving the lifting lever downward to engage the bottom hook, the center bar is lowered to move the wheels to the extended position.

\* \* \* \* \*